United States Patent
Tong et al.

(10) Patent No.: US 8,606,730 B1
(45) Date of Patent: *Dec. 10, 2013

(54) SCALING MACHINE LEARNING USING APPROXIMATE COUNTING

(75) Inventors: Simon Tong, Mountain View, CA (US); Noam Shazeer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,289

(22) Filed: Aug. 3, 2012

Related U.S. Application Data

(63) Continuation of application No. 13/206,273, filed on Aug. 9, 2011, now Pat. No. 8,255,343, which is a continuation of application No. 12/778,877, filed on May 12, 2010, now Pat. No. 8,019,704, which is a continuation of application No. 11/749,588, filed on May 16, 2007, now Pat. No. 7,743,003.

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 5,473,607 A | 12/1995 | Hausman et al. | |
| 6,034,957 A | 3/2000 | Haddock et al. | |
| 7,031,314 B2 | 4/2006 | Craig et al. | |
| 7,743,003 B1 | 6/2010 | Tong et al. | |
| 8,019,704 B1 | 9/2011 | Tong et al. | |
| 2002/0059281 A1 | 5/2002 | Watanabe et al. | |
| 2002/0097724 A1 | 7/2002 | Halme et al. | |
| 2003/0223624 A1 | 12/2003 | Hamid | |
| 2004/0064737 A1 | 4/2004 | Milliken et al. | |
| 2006/0119486 A1 | 6/2006 | Kim et al. | |
| 2006/0242570 A1 | 10/2006 | Croft et al. | |
| 2007/0127824 A1 | 6/2007 | Luo et al. | |
| 2007/0237410 A1* | 10/2007 | Cormode et al. | 382/240 |
| 2008/0140662 A1 | 6/2008 | Pandya | |

OTHER PUBLICATIONS

Parekh et al. "Privacy-Preserving Payload-Based Correlation for Accurate Malicious Traffic Detection", SIGCOMM 2006, pp. 8.*
Michael I. Jordan; "Why the logistic function? A tutorial discussion on probabilities and neural networks"; Computational Cognitive Science Technical Report; Aug. 13, 1995; 13 pages.
Lim et al. "Parallel Multiple Hashing for Packet Classification", IEEE, 2005, pp. 104-107.
Gionis et al. "Similarity Search in High Dimensions via Hashing", Proc. VLDB, 1999, pp. 518-529.
Rouhani et al. "A Novel Design for Classifying Multi-Field Internet Packets Using Neural Networks", Advances in Soft Computing 2, 2005, pp. 757-761.

(Continued)

*Primary Examiner* — Li-Wu Chang
(74) *Attorney, Agent, or Firm* — Harrity & Harrity, LLP

(57) ABSTRACT

A system may track statistics for a number of features using an approximate counting technique by: subjecting each feature to multiple, different hash functions to generate multiple, different hash values, where each of the hash values may identify a particular location in a memory, and storing statistics for each feature at the particular locations identified by the hash values. The system may generate rules for a model based on the tracked statistics.

20 Claims, 9 Drawing Sheets

(56) References Cited

OTHER PUBLICATIONS

Abdelghani et al. "Packet Classification Using Adaptive Rules Cutting (ARC)", Proceedings of the Advanced Industrial Conference on Telecommunications/Service Assurance with Partial and Intermittent Resources Conference/ELearning on Telecommunications Workshop, 2005.

Co-pending U.S. Appl. No. 13/206,273, filed Aug. 9, 2011, entitled "Scaling Machine Learning Using Approximate Counting", by Tong et al., 37 pages.

* cited by examiner

SCALING MACHINE LEARNING USING APPROXIMATE COUNTING

RELATED APPLICATIONS

This application is a continuation of U.S. patent application Ser. No. 13/206,273, filed Aug. 9, 2011, which is a continuation of U.S. patent application Ser. No. 12/778,877, filed May 12, 2010 (now U.S. Pat. No. 8,019,704), which is a continuation of U.S. patent application Ser. No. 11/749,588, filed May 16, 2007 (now U.S. Pat. No. 7,743,003). The entire disclosures are incorporated herein by reference.

BACKGROUND

Machine learning often refers to the design and development of algorithms and techniques that allow computers to learn. The major focus of machine learning research is to extract information from data automatically by computational and statistical methods.

SUMMARY

According to one aspect, a method may include identifying a feature of a number of features in a repository; performing a number of different hash functions on the feature to generate a corresponding number of different hash values; identifying buckets of a group of buckets in a memory based on the hash values; reading values from the identified buckets; updating the values; writing the updated values into the identified buckets; and generating rules for a model based on the values in the group of buckets.

According to another aspect, a device may include a memory and a processor. The memory may store statistics regarding a group of features in buckets. The processor may identify a feature of the group of features, subject the feature to a number of different hash functions to generate a number of different hash values, where the number of hash functions includes at least three different hash functions. The processor may identify a number of the buckets in the memory based on the number of different hash values, read the statistics from the identified buckets, update the statistics, and write the updated statistics into the identified buckets. The processor may also generate rules for a model based on the statistics in the buckets.

According to yet another aspect, a method may include identifying a feature of a set of features in a repository; performing a number of different hash functions on the feature to generate a corresponding number of different hash values; identifying a number of buckets in a memory based on the number of hash values; reading values from the identified buckets; determining a single value from the values; and generating rules for a model based on the single values for a group of the features in the repository.

According to a further aspect, a device may include a memory and a processor. The memory may store statistics regarding a set of features in buckets. The processor may identify a feature of the set of features, subject the feature to a number of different hash functions to generate a corresponding number of different hash values, identify a number of the buckets in the memory based on the number of hash values, read the statistics from the identified buckets, determine a single value from the statistics, and generate rules for a model based on the single values for a group of the features.

According to another aspect, a system implemented within one or more devices is provided. The system may include means for tracking statistics for a group of features using an approximate counting technique including: means for subjecting each feature of the group of features to multiple, different hash functions to generate multiple, different hash values, each of the hash values identifying a particular location in a memory, and means for storing statistics for each feature of the group of features at the particular locations identified by the hash values. The system may also include means for generating rules for a model based on the tracked statistics.

According to yet another aspect, a method may include tracking statistics for a group of features using an approximate counting technique including: tracking statistics for a subset of the features in a memory, identifying a new feature, identifying one of the features in the subset of the features with particular statistics, and replacing the statistics for the identified one of the features with statistics for the new feature in the memory; and generating rules for a model based on the tracked statistics in the memory.

BRIEF DESCRIPTION OF THE DRAWINGS

The accompanying drawings, which are incorporated in and constitute a part of this specification, illustrate one or more embodiments and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Figure 1:
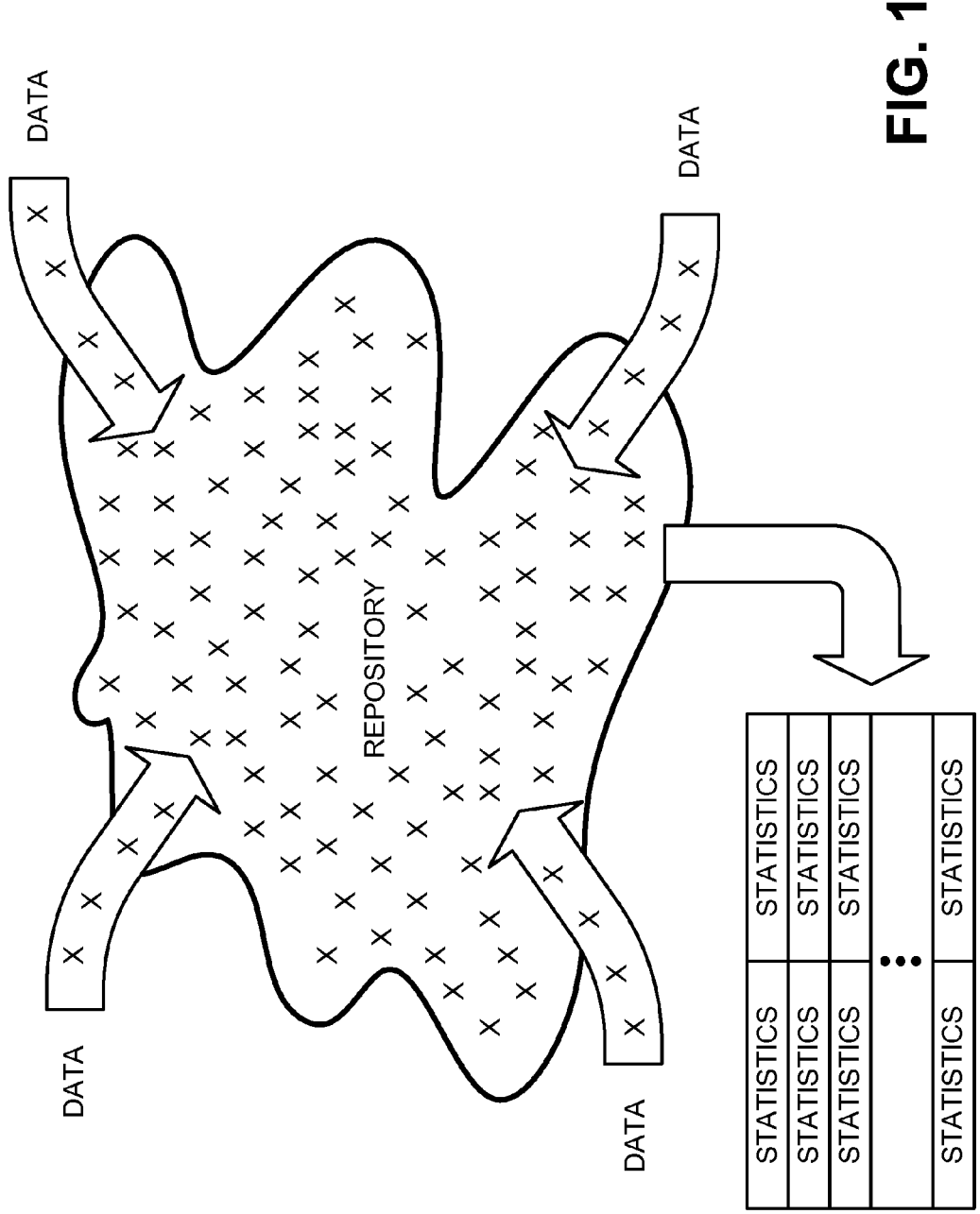
FIG. 1 is a diagram of an overview of an exemplary implementation described herein.

FIG. 1 is a diagram of an overview of an exemplary implementation described herein. As shown in FIG. 1, a repository may be formed from a large set of labeled data (e.g., over one million data elements). In one implementation, the labeled data may include data obtained from a server log. For example, the repository may include e-mail data, advertisement data, and/or other data indicative of user behavior. In one implementation, the data in the repository may be obtained from monitoring user behavior (e.g., the e-mails that users sent and/or received, and/or the advertisements presented to the users and/or selected by the users). User behavior may be monitored with the users' consent. In another implementation, the labeled data may include any type or form of labeled data.

The data in the repository may be used to create rules for a model. In one exemplary implementation, the data may include e-mail data, such as spam and regular (non-spam) e-mail, that may be used to create rules for a model that may predict whether future emails are spam. In another exemplary implementation, the data may include advertisement data, such as advertisements, Uniform Resource Locators (URLs), and/or user information, that may be used to create rules for a model that may predict whether a user will select a particular advertisement. In other exemplary implementations, other types or a combination of types of data may be used.

As shown in FIG. 1, certain statistics (e.g., count values, weight values, or other forms of statistics, such as mean values, standard deviation values, etc.) may be maintained regarding the data in the repository. Implementations described herein may use an approximate counting technique to maintain the statistics. As used herein, "approximate counting" is to be broadly interpreted to include something less precise than exact counting.

The implementations described herein may permit machine learning techniques to be used on a very large data set (e.g., a data set including over one million data elements). By using approximate counting, versus exact counting, a fraction of the number of devices and the amount of memory needed to track certain statistics regarding the large data set are required than had previously been possible. The implementations described herein are also scaleable in the sense that as the size of the data set grows, additional devices and/or additional memory can be added, as needed, without significantly impacting the approximate counting process.

Suitable Approximate Counting System

Figure 2:
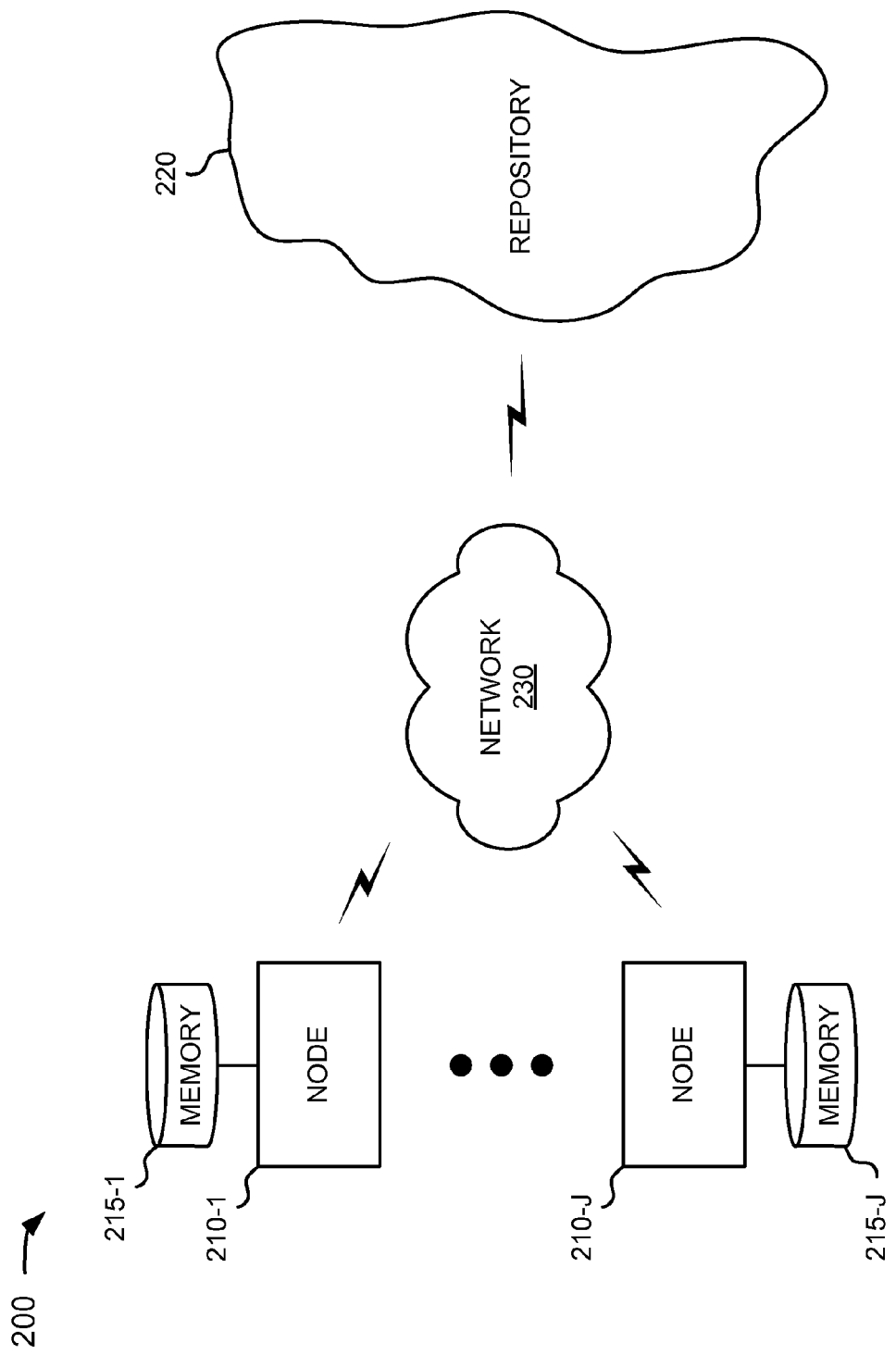
FIG. 2 is a diagram of an exemplary approximate counting system in which systems and methods described herein may be implemented.

FIG. 2 is a diagram of an exemplary approximate counting system 200 suitable for use with systems and methods described herein. System 200 may include nodes 210-1 through 210J (where J≥1) (collectively referred to as nodes 210) optionally connected to a repository 220 via a network 230. Network 230 may include a local area network (LAN), a wide area network (WAN), a metropolitan area network (MAN), a telephone network, such as the Public Switched Telephone Network (PSTN) or a cellular network, an intranet, the Internet, or a combination of networks.

Repository 220 may include one or more logical or physical memory devices that may store a large data set (e.g., potentially over one million elements) that may be used to create and train a model.

The set of data in repository 220 may include multiple elements "d," called instances. An example of an instance may include an e-mail or an advertisement. Repository 220 may store more than one million instances. Each instance d may include a set of features "X" and a label "Y." The label Y may be a value (e.g., "spam" or "non-spam"), which may be called $y_0$ and $y_1$.

A feature X may be an aspect of an instance that may be useful to determine the label (e.g., "the number of exclamation points in the message" or "whether the word 'free' appears in the message"). Repository 220 may store more than one-hundred thousand distinct features. As used herein, the term "feature" is intended to refer to a single feature or a combination of multiple features.

Each feature may have a feature name associated with it. For example, a feature $X_i$ may include the name "feature_i" or "drugs." To assure uniqueness, the feature name may be appended with the feature number (e.g., "Viagra4," "cheap3," or "drugs8") or some other value (e.g., a random number). Each feature X may also include a feature value. In one implementation, a feature $X_i$ may include a Boolean value (e.g., a value of "0" or "1" based on whether the word "free" appears in the message). In another implementation, a feature $X_i$ may include a discrete value (e.g., a value based on the number of exclamation points in the message). In yet another implementation, a feature $X_i$ may include a continuous value (e.g., a value generated as some function of the number of exclamation points in the message or as a function of where "free" appears in the message). An instance d may be written as: $d=(x_1, x_2, x_3, \ldots, x_f, y)$, where $x_i$ is the value of the i-th feature $X_i$ and y is the value of the label.

Nodes 210 may include entities. An entity may be defined as a device, such as a computer device, a personal digital assistant (PDA), a lap top, or another type of computation or communication device, a thread or process running on one of these devices, and/or an object executable by one of these devices.

Each of nodes 210 may be responsible for all or a portion of the instances. In one implementation, node 210 may obtain its instances from repository 220 when needed. In another implementation, each of nodes 210 may optionally store a copy of its instances in a local memory 215. In this case, node 210 may retrieve its copy from repository 220 and store the copy in local memory 215. In yet another implementation, each of nodes 210 may store its instances in local memory 215 and system 200 may include no repository 220.

Figure 3:
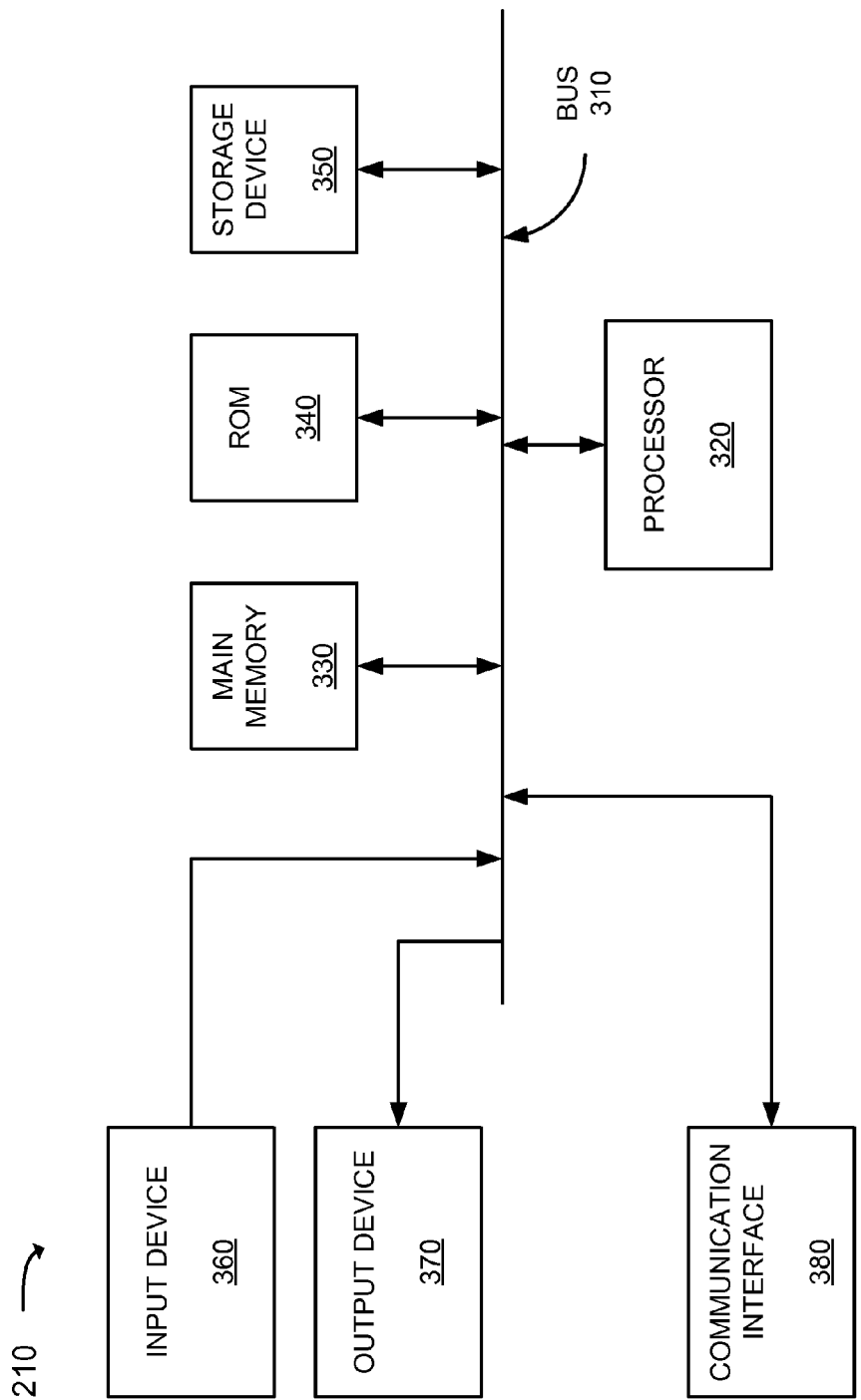
FIG. 3 is a diagram of an exemplary node of FIG. 2.

FIG. 3 is a diagram of an exemplary single node 210. Node 210 may include a bus 310, a processor 320, a main memory 330, a read only memory (ROM) 340, a storage device 350, an input device 360, an output device 370, and a communication interface 380. Bus 310 may include a path that permits communication among the components of node 210.

Processor 320 may include any type of processor, microprocessor, or processing logic that may interpret and execute instructions. Main memory 330 may include a random access memory (RAM) or another type of dynamic storage device that may store information and/or instructions for execution by processor 320. ROM 340 may include a ROM device or another type of static storage device that may store static information and/or instructions for use by processor 320. Storage device 350 may include a magnetic and/or optical recording medium and its corresponding drive or a removable memory device.

Input device 360 may include a mechanism that permits an operator to input information to node 210, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables node 210 to communicate with other devices and/or systems.

As will be described in detail below, node 210 may perform certain approximate counting-related operations. Node 210 may perform these operations in response to processor 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 causes processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
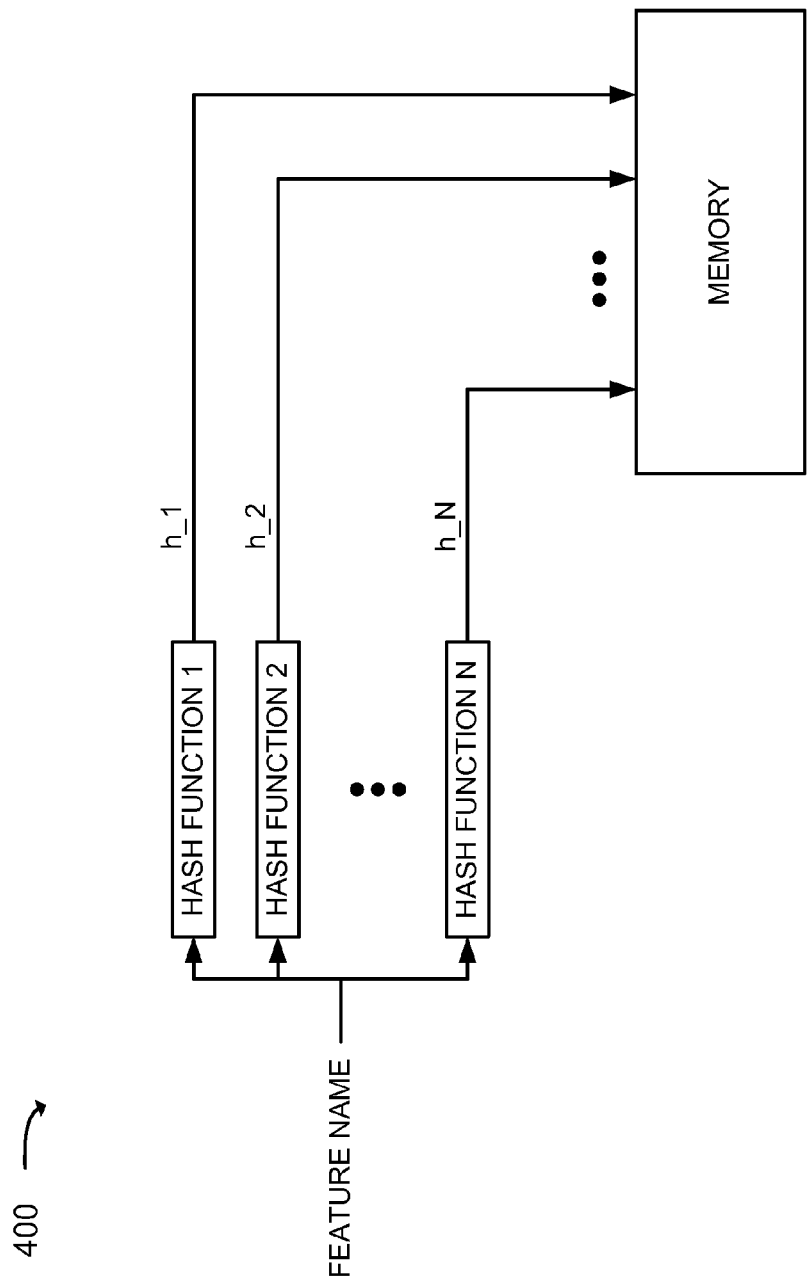
FIG. 4 is a functional block diagram of an exemplary approximate counting system.

FIG. 4 is a functional block diagram of an exemplary approximate counting system 400. Approximate counting system 400 may be implemented as hardware and/or software within one or more of nodes 210.

Approximate counting system 400 may track statistics on all or a subset of the features in repository 220. As shown in FIG. 4, approximate counting system 400 may perform a number of different hash functions 1, 2, . . . , N (where N>1) on a feature name. The feature name for a feature may include a unique string. For example, in the e-mail context, a feature name may include "Viagra," "cheap3," or "drugs."

The feature name may be hashed by multiple, different hash functions to generate multiple, different hash values. Each of the hash functions may include any type of hash function as long as the different hash functions produce different hash values based on the same input. By using multiple hash functions, collisions can be reduced. For a collision to occur between two different feature names, each of the N hash functions would need to hash both feature names to the same hash values. In the case of a combination of features, the i-th hash value might be the sum of the i-th hash values for each of the individual features that form the combination. In another implementation, the i-th hash values for each of the individual features that form the combination may be combined in another manner.

As shown in FIG. 4, the feature name may be hashed by hash function 1 to produce a hash value h_1. The feature name may be hashed by hash function 2 to produce a hash value h_2. Similarly, the feature name may be hashed by hash function N to produce a hash value h_N. Assume that hash values h_1, h_2, . . . , h_N include values that range from 0 to M−1. Hash values h_1, h_2, . . . , h_N may correspond to addresses in a memory.

Figure 5:
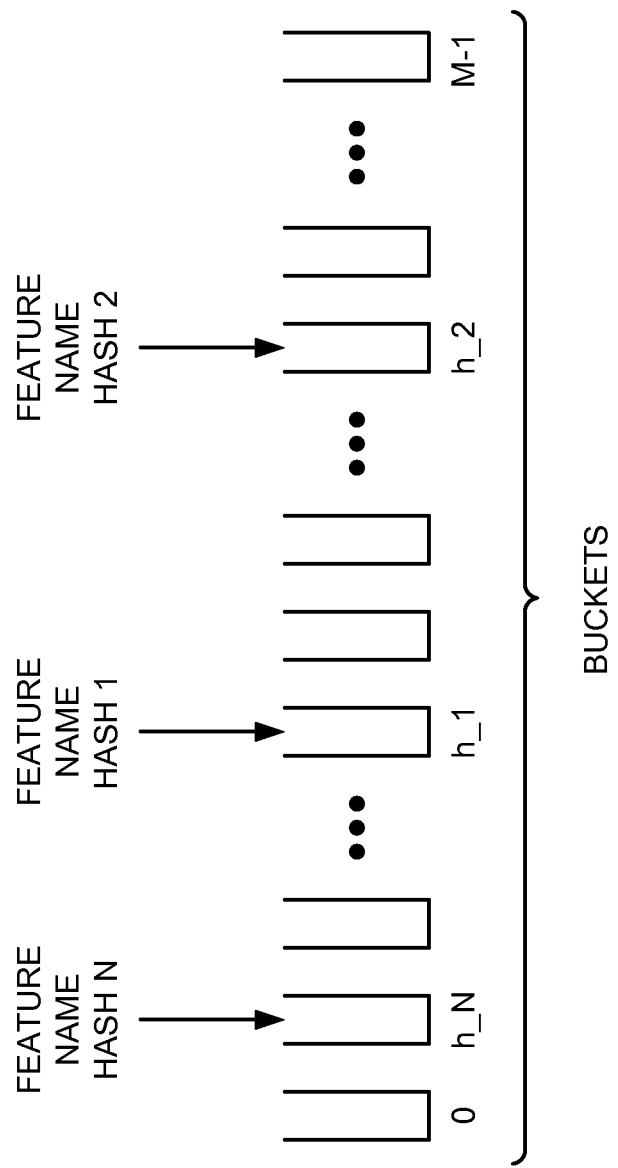
FIG. 5 is a functional block diagram of an exemplary configuration of the memory of FIG. 4.

The memory may, thus, include M memory locations (referred to herein as "buckets"), where M is a number less than the number of features. FIG. 5 is a functional block diagram of an exemplary configuration of the memory. As shown in FIG. 5, the memory may include M buckets (i.e., distinct memory locations) (shown in FIG. 5 as buckets 0 to M−1). Hash values h_1, h_2, . . . , h_N may identify different ones of these buckets. For example, as shown in FIG. 5, hash function 1 may hash the feature name to a hash value of h_1; hash function 2 may hash the feature name to a hash value of h_2; and hash function N may hash the feature name to a hash value of h_N. A read operation or a write operation may be performed on the statistics in the identified buckets.

Exemplary Process

Figure 6A:
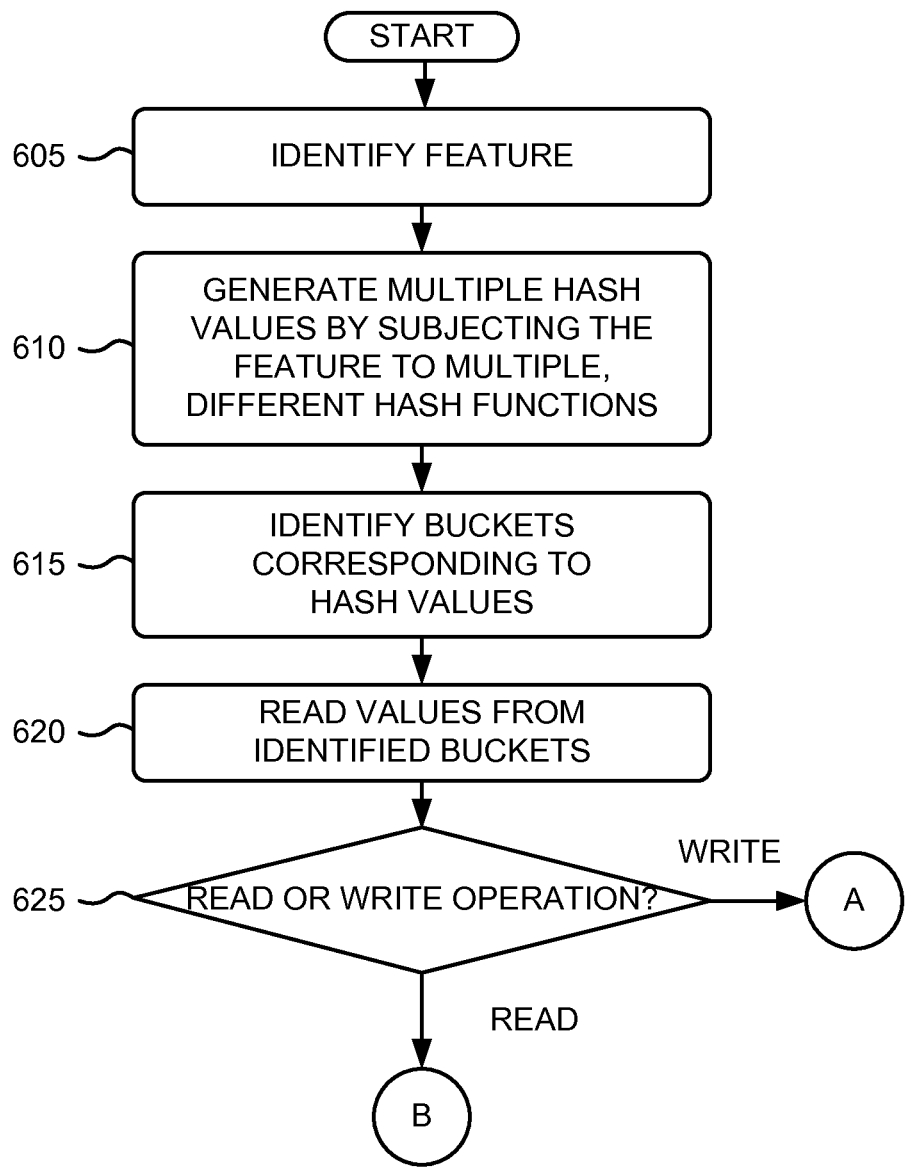
FIGS. 6A-6C illustrate a flowchart of an exemplary process for performing approximate counting.
Figure 6B:
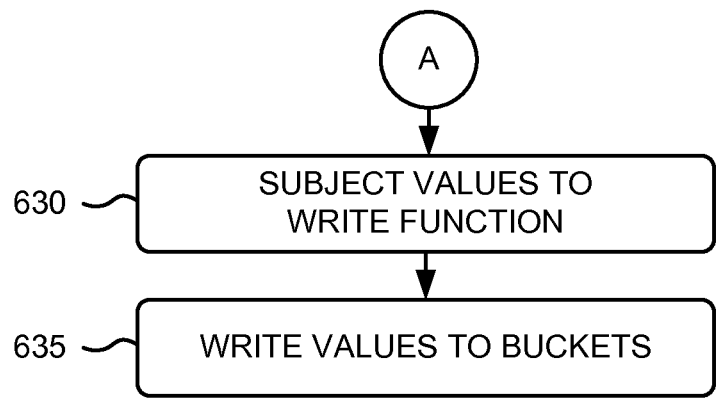
Figure 6C:
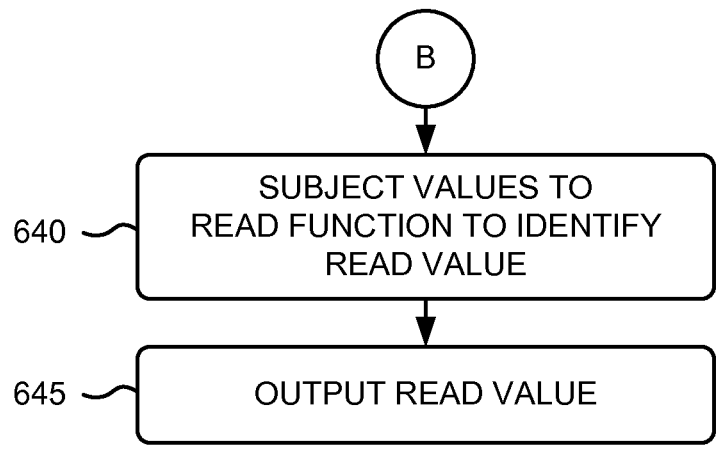

FIGS. 6A-6C illustrate a flowchart of an exemplary process for performing approximate counting. The process may be performed by a single node 210 or a combination of multiple nodes 210. The process may use an approximate counting technique to track statistics regarding features to facilitate generation of rules for a model (e.g., a model that predicts whether future e-mails are spam, a model that predicts whether a user will select a particular advertisement, etc.).

During the model generation process, it may be beneficial to track statistics regarding features in repository 220. The statistics for a particular feature might include, for example, a feature count (e.g., the number of instances in repository 220 that include the particular feature) and/or a weight associated with the particular feature. The statistics might be used to identify those features that might be useful in forming rules for the model. For example, those features whose statistics indicate that the features occur more than a threshold number of times in different instances and/or that have weight values that are significantly far from zero might be included in a special group for which their statistics and/or weights might be tracked more exactly. The features in the special group might still be quite large (e.g., over one thousand features). The goal of the model generation process may be to use the statistics of the special group and/or the set of approximate statistics to induce a function f such that given a feature vector x, the output f(x) may be a good prediction of the true label y.

The process may begin with a feature being identified (block 605). For example, node 210 may select a feature that appears in at least one instance. Node 210 may process all or a subset of the features in repository 210. At any particular time, node 210 may process one or more features to perform some operation (e.g., a write operation or a read operation). For example, node 210 may need to update or read a value associated with the feature (e.g., a count value or a weight value).

Multiple hash values may be generated for the feature by subjecting the feature to multiple, different hash functions (block 610). For example, as shown in FIG. 4, the feature name may be subjected to hash functions 1, 2, . . . , N to generate hash values h_1, h_2, . . . , h_N.

Buckets corresponding to the hash values may be identified (block 615). For example, hash value h_1 may correspond to a first address, hash value h_2 may correspond to a second address, . . . , and hash value h_N may correspond to an Nth address. These addresses may identify particular buckets of the group of buckets in the memory. As shown in FIG. 5, for example, assume that the first address identifies bucket h_1, the second address identifies bucket h_2, and the Nth address identifies bucket h_N.

Values may be read from the identified buckets (block 620). For example, each of the buckets may store statistics (e.g., a count value and/or a weight value). An operation may be performed on the N values read from the N identified buckets. The operation may include a write operation or a read operation. For example, node 210 may need to increment a count value associated with the feature and, therefore, may perform a write operation. Alternatively, node 210 may need to simply determine the count value associated with the feature and, therefore, may perform a read operation.

If a write operation is performed (block 625—WRITE), the N values may be subjected to a write function (block 630) (FIG. 6B) that produces N resultant values. The N resultant values may be written to the N identified buckets (block 635).

Figure 7:
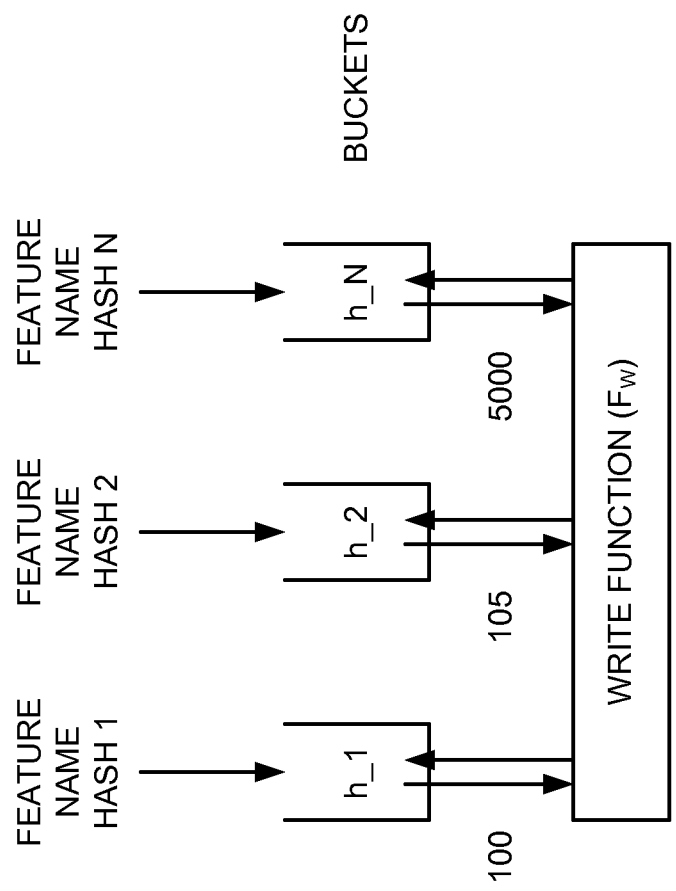
FIG. 7 is a functional block diagram illustrating an exemplary write function.

For example, assume that the write function involves incrementing count values stored in the identified buckets by a particular amount. As shown in FIG. 7, assume that the count values include the following: 100 (bucket h_1), 105 (bucket h_2), and 5000 (bucket h_N). The difference in these values may be due to collisions that occurred when hashing feature names.

The write function may take N values and increment them in some manner. The particular manner in which the N values are incremented may depend on performance considerations. In one exemplary implementation, the write function may determine the minimum count value (e.g., 100), increment the minimum count value by one (e.g., 100+1=101), and write the incremented value (e.g., 101) to each of the identified buckets. In another exemplary implementation, the write function may increment each of the count values by one (e.g., 100+1=101; 105+1=106; 5000+1=5001), and write the incremented values (101, 106, 5001) to the corresponding ones of the identified buckets. In yet another exemplary implementation, the write function may take the mean or median count value, increment that mean or median count value by one, and store the incremented value in each of the identified buckets.

In a further implementation, the write function may increment the count values in another way.

Figure 8:
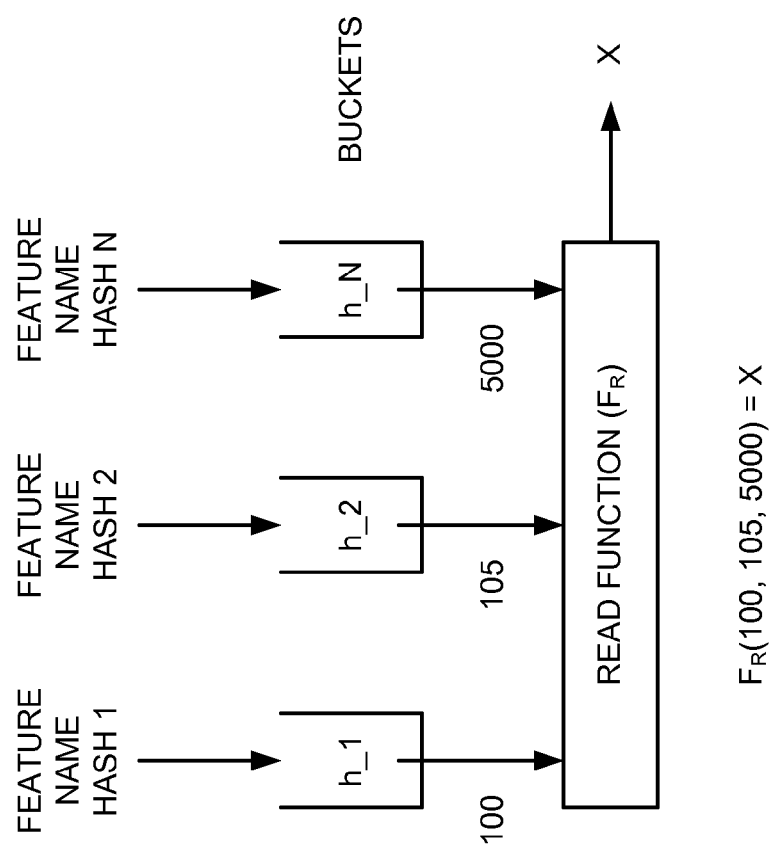
FIG. 8 is a functional block diagram illustrating an exemplary read function.

If a read operation is performed (block 625—READ), the N values may be subjected to a read function to identify a read value (block 640) (FIG. 6C), which may then be output (block 645). For example, assume that the read function involves determining a single value from the count values stored in the identified buckets. As shown in FIG. 8, assume that the count values include the following: 100 (bucket h_1), 105 (bucket h_2), and 5000 (bucket h_N). The difference in these values may be due to collisions that occurred when hashing feature names.

The read function may take the N values and determine a single (approximated) value for the feature from the N values in some manner. The particular manner in which a single value is determined from the N values may depend on performance considerations. In one exemplary implementation, the read function may take one of the N count values (e.g., the minimum count value) as the single count value. In another exemplary implementation, the read function may determine the mean or median count value from the N count values and use this mean or median count value as the single count value. In yet another exemplary implementation, the read function may determine a single count value from the N count values in another way.

The process of FIGS. 6A-6C may be repeated for other features in one or more nodes 210. In one implementation, a single node 210 may be selected to process a particular feature. For example, the feature name of the particular feature may be subjected to a hash function to generate a hash result that may be used to select which node 210 is to process the particular feature. The selected node 210 may then perform the process of FIGS. 6A-6C with regard to the particular feature.

The process of FIGS. 6A-6C may be used to identify those features that appear useful in forming rules for a model. A feature might be determined to be useful if its count value is greater than a threshold (indicating that the feature has appeared in more than the threshold number of instances in repository 220) and/or its weight value is significantly far from zero. A useful feature may be promoted to a special group in which it may have its statistics exactly (or more exactly) tracked. Features from the special group may then be used to form rules for a model.

While one approximate counting process has been described, other approximate counting processes may be used in other implementations. For example, rather than keeping track of all statistics, statistics may be tracked for M features. In this case, the goal may be to keep track of the statistics from the M most important features, and ignore the others.

This exemplary approximate counting process may initially keep track of the statistics for each new feature that is encountered in repository 220. Eventually, the M available memory locations in the memory will fill up. If a new feature u is encountered, then a decision may be made: either feature u can be ignored, or feature u can replace one of the M existing features. Each of the existing M existing features may be examined, and the feature with the least number of occurrences in instances in repository 220 may be replaced. Alternatively, the feature with a weight value closest to zero may be replaced, or some other criteria may be used to identify which feature to replace. In one implementation, the feature with the least number of occurrences or with a weight value closest to zero of the M existing features may always be replaced, or may be replaced based on some probability that perhaps depends on its stored statistics (e.g., discard the feature as a function of 1/(number of instances that contain that feature)).

Alternatively, another suitable counting technique may keep track of integer counts (e.g., the number of instances matching a feature). If there is not enough memory to store the statistics for all of the features exactly, the statistics may be represented in a reduced number of bits (e.g., two bits may be used to represent the count, so the maximum count would be four). If a count for a feature exceeds four, then that feature may be promoted to the special group and have its statistics tracked exactly. This process is especially beneficial in the situation where the majority of the features never exceed a count of four.

Yet another exemplary approximate counting process may use a combination of techniques described above.

Exemplary Model Generation Process

To facilitate generation of the model, a machine learning algorithm based on logistic regression may be used. One exemplary machine learning algorithm may be based on logistic regression using gradient descent. This exemplary machine learning algorithm may perform feature selection. In one implementation, a "rule set" may be maintained. A "rule set" may be defined as a set of functions that together can map a feature vector to a predicted label. In this exemplary machine learning algorithm, the "rule set" may include a set of features together with a weight for each feature.

The machine learning algorithm may be performed on multiple devices, such as nodes 210 (FIG. 2) or devices separate from nodes 210. Each of nodes 210 may track statistics for a subset of features.

Assume that a node 210 is given a new instance (x, y) to process. Node 210 may broadcast a request to all nodes 210 requesting the statistics for some number of features that are present in the feature vector x. The requested features might be those that are in a rule set for the model plus a set of other candidates (e.g., all single features and/or features formed by extending existing rule-set features by one other feature present in the feature vector). The returned statistics might come from either the approximate counting pool, the special group (i.e., those statistics that are exactly tracked), or both.

The statistics for a feature may include the weight for that feature. Node 210 may use the weight for each feature that is in the rule set to compute the prediction:

$$f(x)=\text{Sum\_i\_in\_rule\_set (feature\_i\_weight}*\text{feature\_i\_value)},$$

where "Sum_i_in_rule_set" may refer to the sum over all of the features in the rule set.

Node 210 may then compute an update for each feature (including those features that are not in the rule set):

$$\text{feature\_i\_weight}=\text{feature\_i\_weight}+\alpha*(y-f(x))-\beta)*\text{feature\_i\_value},$$

where $\alpha$ may include a small value (e.g., 0.01, or 1/(the number of instances that contain feature_i)).

If feature_i is not in the rule set, then:

$$\beta=\text{feature\_i\_weight}*\text{feature\_i\_value; otherwise } \beta=0.$$

After the weights have been updated, some of the features may be promoted to the rule set (e.g., if their weight is significantly away from zero). The process may be repeated for subsequent instances

CONCLUSION

Implementations described herein may use an approximate counting technique to maintain statistics regarding a large set of data (e.g., a data set including more than one million instances and more than one hundred thousand features). A machine learning algorithm may use the statistics to form rules for a model.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 6A-6C, the order of the blocks may be modified in other implementations. Also, non-dependent blocks may be performed in parallel. Further, the blocks may be modified in other ways. For example, in another exemplary implementation, the blocks of FIGS. 6A-6C may be performed in a loop for a number of features.

It will also be apparent that aspects, as described above, may be implemented in many different forms of software, firmware, and hardware in the implementations illustrated in the figures. The actual software code or specialized control hardware used to implement these aspects is not limiting of the invention. Thus, the operation and behavior of the aspects were described without reference to the specific software code—it being understood that software and control hardware can be designed to implement these aspects.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    storing, by a computer device and in a plurality of memory locations in a memory, values relating to a feature of a feature set;
    subjecting, by the computer device, a string, associated with the feature, to multiple, different hash functions to generate multiple, different hash values;
    identifying, by the computer device and for each of the multiple, different hash values, a respective memory location, of the plurality of memory locations, in the memory;
    reading, by the computer device, the values stored at the respective memory locations;
    performing, by the computer device, an operation on the read values, from the respective memory locations, to obtain updated values, the performing including:
        identifying a value from the read values,
        updating the value, and
        replacing each of the read values with the updated value; and
    using, by the computer device, the updated values to make a prediction regarding particular data.

2. The method of claim 1, further comprising:
    storing the updated values into the respective memory locations.

3. The method of claim 1, where the operation is a write operation, the method, when performing the write operation, including:
    determining a minimum count value of the read values;
    incrementing the minimum count value; and
    writing the updated values, associated with the read values and based on the incremented minimum count value, to the respective memory locations.

4. The method of claim 1, where the operation is a write operation, the method, when performing the write operation, including:
    determining a mean count value of the read values or a median count value of the read values;
    incrementing the mean count value or the median count value; and
    writing the updated values, associated with the read values and based on the incremented mean count value or the incremented median count value, to the respective memory locations.

5. The method of claim 1, where
    the value is a minimum value.

6. The method of claim 1, where
    the value is a mean value or a median value,
        the mean value or the median value being determined from the read values.

7. The method of claim 1, where, when using the updated values to make the prediction, the method further includes:
    generating rules for a model based on the updated values.

8. One or more devices comprising:
    one or more processors; and
    one or more memories including a plurality of instructions that, when executed by the one or more processors, cause the one or more processors to:
        store, in a plurality of memory locations in a memory, values relating to a feature of a feature set;
        subject a string, associated with the feature, to multiple, different hash functions to generate multiple, different hash values;
        identify, for each of the multiple, different hash values, a respective memory location, of the plurality of memory locations, in the memory;
        read the values stored at the respective memory locations;
        perform an operation on the read values, from the respective memory locations, to obtain updated values, the one or more processors, when performing the operation, being to:
            identify a value from the read values,
            update the value, and
            replace each of the read values with the updated value; and
        use the updated values to make a prediction regarding particular data.

9. The one or more devices of claim 8, where the one or more processors are further to:
    store the updated values into the respective memory locations.

10. The one or more devices of claim 8, where the operation is a write operation, and the one or more processors are further to:
    determine a minimum count value of the read values;
    increment the minimum count value; and
    write the updated values, associated with the read values and based on the incremented minimum count value, to the respective memory locations.

11. The one or more devices of claim 8, where the operation is a write operation, and the one or more processors are further to:
    determine a mean count value of the read values or a median count value of the read values;
    increment the mean count value or the median count value; and write the updated values, associated with the read values and based on the incremented mean count value or the incremented median count value, to the respective memory locations.

12. The one or more devices of claim 8, where the value is a minimum value.

13. The one or more devices of claim 8, where the value is a mean value or a median value,
the mean value or the median value being determined from the read values.

14. The one or more devices of claim 8, where, when using the updated values to make the prediction, the one or more processors are further to:
generate rules for a model based on the updated values.

15. A non-transitory computer-readable storage medium storing instructions, the instructions comprising:
one or more instructions which, when executed by at least one processor, cause the at least one processor to:
store, in a plurality of memory locations in a memory, values relating to a feature of a feature set;
subject a string, associated with the feature, to multiple, different hash functions to generate multiple, different hash values;
identify, for each of the multiple, different hash values, a respective memory location, of the plurality of memory locations, in the memory;
read the values stored at the respective memory locations;
perform an operation on the read values, from the respective memory locations, to obtain updated values, the one or more instructions to perform the operation including one or more instructions which, when executed by the at least one processor, cause the at least one processor to:
identify a value from the read values,
update the value, and
replace each of the read values with the updated value; and
use the updated values to make a prediction regarding particular data.

16. The medium of claim 15, further comprising:
one or more instructions to store the updated values into the respective memory locations.

17. The medium of claim 15, where the operation is a write operation, and the one or more instructions include:
one or more instructions to determine a minimum count value of the read values;
one or more instructions to increment the minimum count value; and
one or more instructions to write the updated values, associated with the read values and based on the incremented minimum count value, to the respective memory locations.

18. The medium of claim 15, where the operation is a write operation, and the one or more instructions include:
one or more instructions to determine a mean count value of the read values or a median count value of the read values;
one or more instructions to increment the mean count value or the median count value; and
one or more instructions to write the updated values, associated with the read values and based on the incremented mean count value or the incremented median count value, to the respective memory locations.

19. The medium of claim 15, where the value is a minimum value.

20. The medium of claim 15, where the value is a mean value or a median value,
the mean value or the median value being determined from the read values.

* * * * *